United States Patent
Bates et al.

(10) Patent No.: US 6,367,074 B1
(45) Date of Patent: Apr. 2, 2002

(54) OPERATION OF A SYSTEM

(75) Inventors: Sarah E. Bates, Pala Alto, CA (US); T. Andrew Crump, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 0 days.

(21) Appl. No.: 09/221,536

(22) Filed: Dec. 28, 1998

(51) Int. Cl.$^7$ ............................................. G06F 9/445

(52) U.S. Cl. ................................ 717/11; 717/1; 713/2; 713/10; 709/301; 709/331

(58) Field of Search .......................... 717/11, 1; 713/1, 713/2, 10; 709/241, 315, 203, 232

(56) References Cited

U.S. PATENT DOCUMENTS

| | | | |
|---|---|---|---|
| 5,361,358 A | * 11/1994 | Cox et al. | 717/11 |
| 5,485,579 A | * 1/1996 | Hitz et al. | 709/221 |
| 5,675,782 A | * 10/1997 | Montague et al. | 713/201 |
| 5,715,456 A | * 2/1998 | Bennett et al. | 713/2 |
| 5,764,984 A | * 6/1998 | Loucks | 709/302 |
| 5,787,251 A | * 7/1998 | Hamilton et al. | 709/203 |
| 5,793,982 A | * 8/1998 | Shrader et al. | 709/232 |
| 5,887,163 A | * 3/1999 | Nguyen et al. | 713/2 |
| 6,009,476 A | * 12/1999 | Flory et al. | 709/301 |
| 6,052,781 A | * 4/2000 | Weber | 713/200 |
| 6,065,037 A | * 5/2000 | Hitz et al. | 709/200 |
| 6,066,182 A | * 5/2000 | Wilde et al. | 717/11 |
| 6,067,618 A | * 5/2000 | Weber | 713/1 |
| 6,157,961 A | * 12/2000 | Kessler et al. | 709/315 |
| 6,178,503 B1 | * 1/2001 | Madden et al. | 713/2 |
| 6,253,258 B1 | * 6/2001 | Cohen | 709/331 |
| 6,260,140 B1 | * 7/2001 | McKeeth | 713/100 |

OTHER PUBLICATIONS

Don Crabb, "Data Synchronization—the Next Big Thing?", pp. 1–2 (Jan. 22, 1998).

Puma Technology, Inc., "Puma's IntelliSync for AT & T PocketNet Service Synchronizes Your Life," pp. 1–4 (Oct. 6, 1997).

U.S. Pat. application Ser. No. 09/070,419, Filed Apr. 30, 1998, entitled *Initializing and Restarting Operating Systems*.

Dynamic Software Reconfigurating Using System Management Mode, Embedded Systems Conference, pp. 1–9 (Fall 1995).

TI: Banks Grapple With An Operating Systems Dilemma: NT or OS/2? Windows NT to capture 2% of mkt for financial svcs application, source: Bank Technology News, (Apr. 1994).*

TI: Creating a Win–Win situation, InfoWorld; Framingham; Aug. 21, 1995; Ligingston et al.*

TI: Java on DOS could turn old PCs into Ncs; Computerworld; Framingham; Feb. 17, 1997; Gaudin, Sharon; Jacobs.*

TI: The wonders and wizards of windows installation utilities; E media progrssional; Wilton; Oct. 1997' Stephen Ellerin.*

* cited by examiner

*Primary Examiner*—Mark R. Powell
*Assistant Examiner*—Chameli C. Das
(74) *Attorney, Agent, or Firm*—Trop, Pruner & Hu, P.C.

(57) ABSTRACT

A system includes an operating system capable of providing a first operating environment and a first routine running outside the first operating environment. The first routine is adapted to selectively load the operating system or to present an interface through which a user may access and change or update predetermined information. The routine is adapted to transition the system to an off state without loading the operating system.

24 Claims, 3 Drawing Sheets

OPERATION OF A SYSTEM

BACKGROUND

The invention relates to operation of a system such as a computer.

In systems such as computers, an operating environment is defined in which software may be run. Conventionally, an operating environment may be provided by an operating system, such as the Windows® operating system by Microsoft Corporation. An operating system may be software that controls execution of programs and that provides certain support services such as scheduling, input/output control, compilation, data management, and other services.

When a system starts up, a startup routine such as a basic input/output system (BIOS) routine performs certain tasks to boot the system. Near the end of the startup process, the operating system typically is booted. Because of the various services that an operating system typically provides, the time needed to boot and load the operating system may be relatively long. When a user wants to access information stored in a system, the system is turned on (if originally off) and the operating system is loaded so that the appropriate application program or programs may be started to view or update the information. For example, the information may include a calendar or some other list. To access such information, a calendar or other information management application program is run. Having to wait for the operating system to boot and the application to start after a system is turned on delays access to the desired information.

A need thus exists for a technique and apparatus that provides quicker access to desired information and features of a system.

SUMMARY

In general, according to one embodiment, a method of operating a system includes receiving an indication of whether to provide a predefined operating environment in the system and running a routine outside the predefined operating environment if the predefined operating environment is not to be provided. Under control of the routine, requests to access information contained in a storage medium in the system may be received.

Other features and embodiments will become apparent from the following description and from the claims.

DETAILED DESCRIPTION

Figure 1:
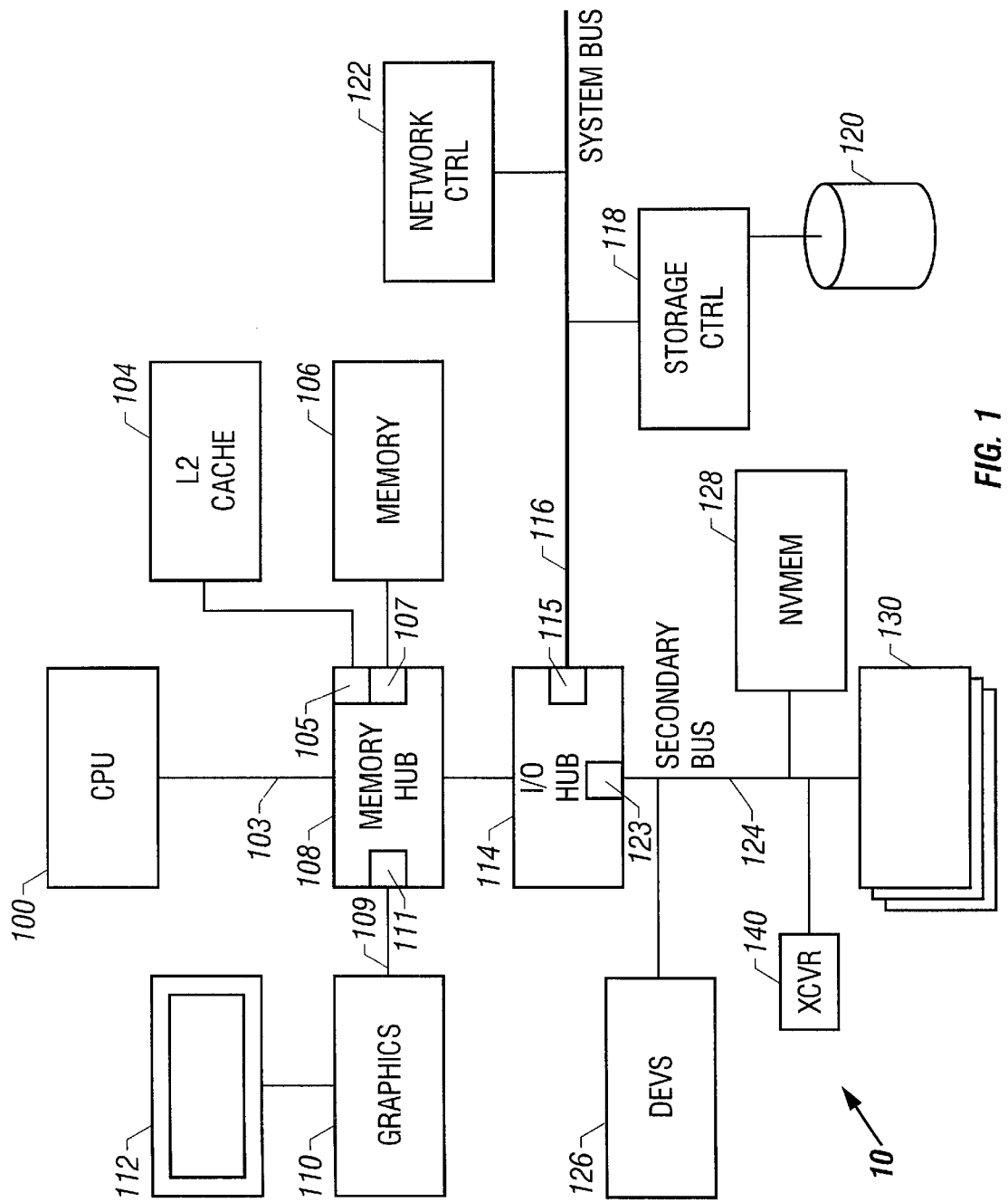
FIG. 1 is a block diagram of an embodiment of a system.

In the following description, numerous details are set forth to provide an understanding of the present invention. However, it is to be understood by those skilled in the art that the present invention may be practiced without these details and that numerous variations or modifications from the described embodiments may be possible.

In some embodiments, a system includes a full-feature operating environment (that is provided by an operating system) and an alternative operating environment that may provide a reduced set of features. The system is able to enter into the alternative operating environment more quickly than to the full-feature operating environment. In this description, the alternative operating environment is referred to as a "Quicknote" environment. The operating system that provides the full-feature operating environment may be a Windows® operating system (e.g., Windows® 95, 98, or NT), a Unix operating system, or other operating systems. In further embodiments, additional operating environments may be provided in the system.

Services provided by the full-feature operating system may include one or more of the following: management of program execution, scheduling, input/output control, compilation, data management, and other services. The Quicknote environment may support a reduced set of features, e.g., providing access to predetermined information or features in the system. According to embodiments of the invention, the system can enter the Quicknote environment more quickly than it can the full-feature operating environment from a system off state. By entering the Quicknote environment, a user may quickly access certain information and features, such as calendar information, address lists, notes, electronic mail, and the like.

In further embodiments, the Quicknote environment may provide access to such features as communication components in the system to enable communication with devices outside the system. Such communication components may include a modem or a wireless communication chip to enable communication over a wired or wireless channel.

Entering the Quicknote environment to access information and features may be particularly advantageous when the user is in a hurry since the user can quickly turn on a system, access the desired information or feature without having to load the full-feature operating system, and exit the system. Later, when the user has more time, the user may boot the full-feature operating system.

According to some embodiments, the system may have several off states: a powered off state (in which power to the system is cut off) and some type of low power state such as a sleep state, suspend state, or soft off state. In some of the low power states, the context of the system may be saved to the hard disk drive or other non-volatile storage medium before the system is powered off. From the powered off state, a startup routine, such as a basic input/output system (BIOS) routine, restarts the system by performing a cold boot sequence which may include initialization of system devices, saving system configuration information, and allocating system resources. From a low power state in which system context has been saved in some non-volatile storage medium, the BIOS routine may resume operation of the system from the saved system context information.

As examples, the off states may include states defined under the Advanced Configuration and Power Interface (ACPI) Specification, Revision 1.0, dated Dec. 22, 1996. Example off states as defined by the ACPI specification include a mechanical off state (in which power is cut off from components in the system), a soft off state, and several sleep states. In some of the defined sleep states, system context is lost. To resume from one of these states to a working state, a BIOS routine restores some settings from a non-volatile storage medium and control is passed to the operating system, which may resume executing from an address location stored before the system entered the sleep state. Other off states may include those defined by the Advanced Power Management (APM) BIOS Interface Specification, Version 2.1, dated February 1996.

From any of the off states, the system can optionally boot to the Quicknote environment or to the full-feature operating environment, such as in response to user input or as specified by an indicator stored in a non-volatile storage medium in the system.

Referring to FIG. 1, in one embodiment, a system 10 includes a central processing unit (CPU) 100, which may include a general-purpose or special-purpose processor such as a microprocessor, microcontroller, an application-specific integrated circuit (ASIC), a programmable gate array (PGA), and the like. The CPU 100 may be coupled over a host bus 103 to a memory hub 108 in one embodiment, which may include a memory controller 107 coupled to a main memory 106. In addition, the memory hub 108 may include a cache controller 105 coupled to an L2 cache 104. The memory hub 108 may also include a graphics interface 111 that is coupled over a link 109 to a graphics controller 110, which is in turn coupled to a display 112. As an example, the graphics interface 111 may be according to the Accelerated Graphics Port (A.G.P.) Interface Specification, Revision 2.0, dated in May 1998.

The memory hub 108 may also be coupled to an input/output (I/O) hub 114 that includes bridge controllers 115 and 123 coupled to a system bus 116 and a secondary bus 124, respectively. As an example, the system bus may be a Peripheral Component Interconnect (PCI) bus, as defined by the PCI Local Bus Specification, Production Version, Revision 2.1, dated in June 1995. The system bus 116 may be coupled to a storage controller 118 that controls access to one or more storage devices 120, including a hard disk drive, a compact disc (CD) drive, or a digital video disc (DVD) drive. Other storage media may also be included in the system.

In an alternative embodiment, the storage controller 118 may be integrated into the I/O hub 114, as may other control functions. The system bus 116 may also be coupled to other components, including, for example, a network controller 122 that is coupled to a network port (not shown).

Additional devices 126 may be coupled to the secondary bus 124, such as an input/output control circuit coupled to a parallel port, serial port, and/or floppy disk drive. A non-volatile memory 128 may also be coupled to the secondary bus 124. Further, a transceiver 140, which may include a modem or a wireless communications chip, as examples, may also be coupled to the secondary bus 124.

Although the description makes reference to specific components of the system 10, it is contemplated that numerous modifications and variations of the described and illustrated embodiments may be possible. For example, instead of memory and I/O hubs, a host bridge controller and a system bridge controller may provide equivalent functions, with the host bridge controller coupled between the CPU 100 and the system bus 116 and the system bridge controller 124 coupled between the system bus 116 and the secondary bus 124. In addition, any of a number of bus protocols may be implemented.

Figure 4:
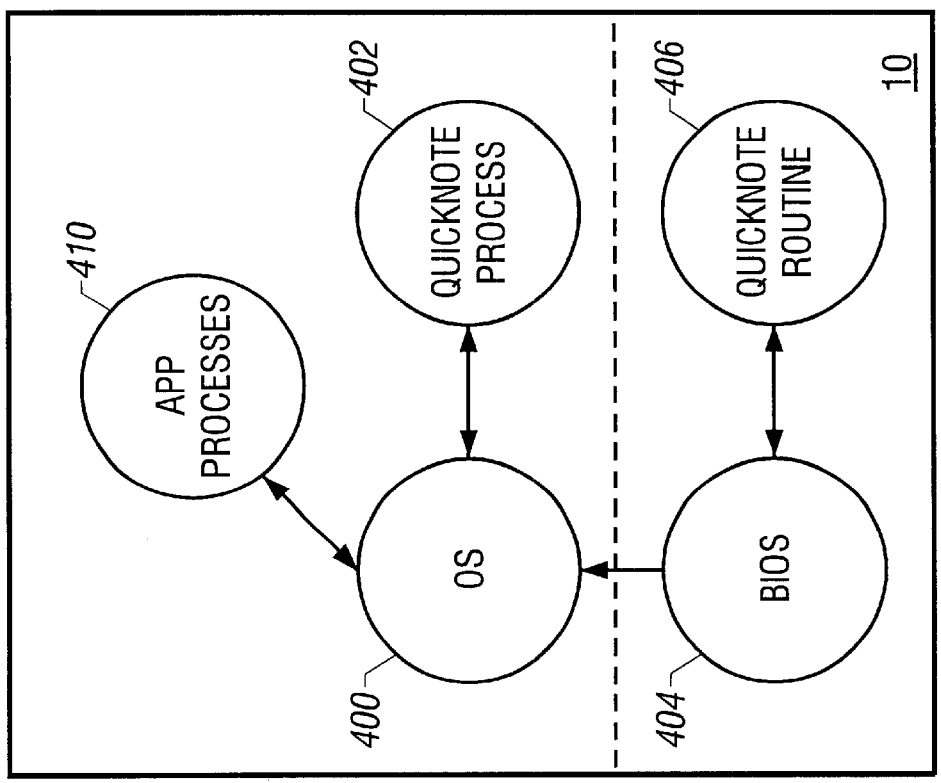
FIG. 4 illustrates software and firmware layers in the system of FIG. 1.

Referring to FIG. 4, software and firmware in the system 10 may include a startup routine 404 (such as a BIOS routine), a Quicknote routine 406, an operating system 400, a Quicknote companion applet 402, application programs 410, and other routines or modules. In one embodiment, under control of the BIOS routine 404, the system 10 may enter one of two operating environments: the full-feature operating environment in which the operating system 400 (e.g., a Windows® operating system) and various processes, including the Quicknote companion applet 402, are loaded; and the Quicknote environment in which the Quicknote routine 406 (invoked by the BIOS routine 404) controls access to certain information and features.

The BIOS routine 404 may be initially stored in the non-volatile memory 128, which may by way of example include a flash memory, an electrically erasable and programmable read-only memory (EEPROM), a battery-backed random access memory (RAM) such as an static RAM (SRAM) or dynamic RAM (DRAM). When the system 10 starts up from an off state, the CPU 100 accesses the non-volatile memory 128 to execute instructions of the BIOS routine 404 stored in the memory 128.

Figure 3:
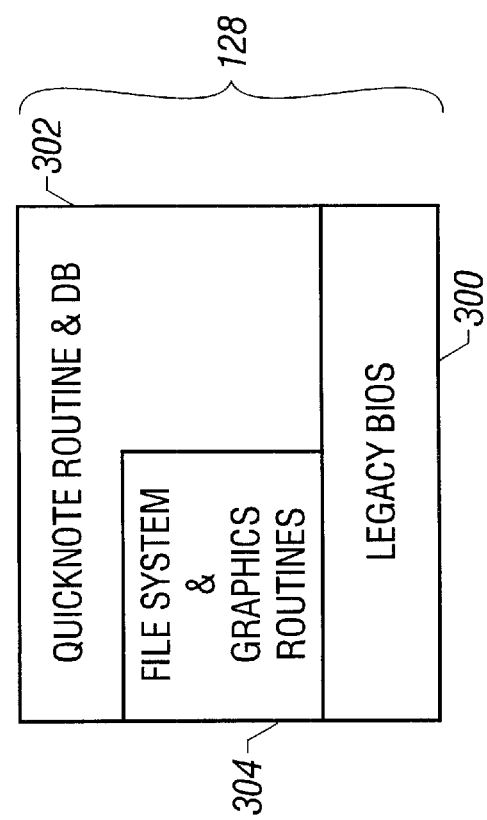
FIG. 3 illustrates data stored in a non-volatile memory in the system of FIG. 1.

As further illustrated in FIG. 3, the non-volatile memory 128 according to one embodiment may store one or more routines to perform various operations. In the following description, reference is made to different segments that store different routines. It is to be understood, however, that the described routines may be integrated in fewer routines (down to one, for example) than indicated in FIG. 3. The non-volatile memory 128 may include a first segment 300 that stores standard startup routines, including the system BIOS routine 404. In addition, a second segment 302 of the non-volatile memory 128 may store the Quicknote routine 406 that is invoked by the BIOS routine 404 to enter the Quicknote environment to enable access to predetermined information and features. Information accessible by the Quicknote routine 406 may be stored in a storage medium such as the hard disk drive 120 or other suitable storage medium. Such information is included in a Quicknote database (DB). Optionally, in one embodiment, the second segment 302 may also store a database that includes a subset of the Quicknote DB to allow a user faster access to the subset of information in the nonvolatile memory 128 while the hard disk drive 120 is spinning up.

Graphics routines may be stored in a third segment 304 of the non-volatile memory 128. In the Quicknote environment, the graphics routines may be executed to provide a graphical user interface on the display 112. Alternatively, a relatively simple video routine may be stored in the non-volatile memory segment 304 to provide a simple text user interface. In addition, file system routines may also be stored in the segment 304 that are executed to control access of storage media in the system, including the hard disk drive, a floppy disk drive, or other storage medium. File system routines may include file allocation table (FAT) file system routines, e.g., FAT16 or FAT32 routines, that support access to hard disk drives. The graphics and file system routines stored in the memory segment 304 may be embedded DOS routines in one embodiment.

In addition, routines controlling access to the transceiver 140, which may be a modem or a wireless communications chip, may also be included in the memory segment 304. Such routines may be loaded in the Quicknote environment to enable communication of information, such as those in the Quicknote DB, to an external device. Depending on what other features are desired in the Quicknote environment, additional routines may be included in the memory segment 304. It is noted that data stored in the non-volatile memory 128 may be stored in other suitable non-volatile storage media in further embodiments.

Figure 2:
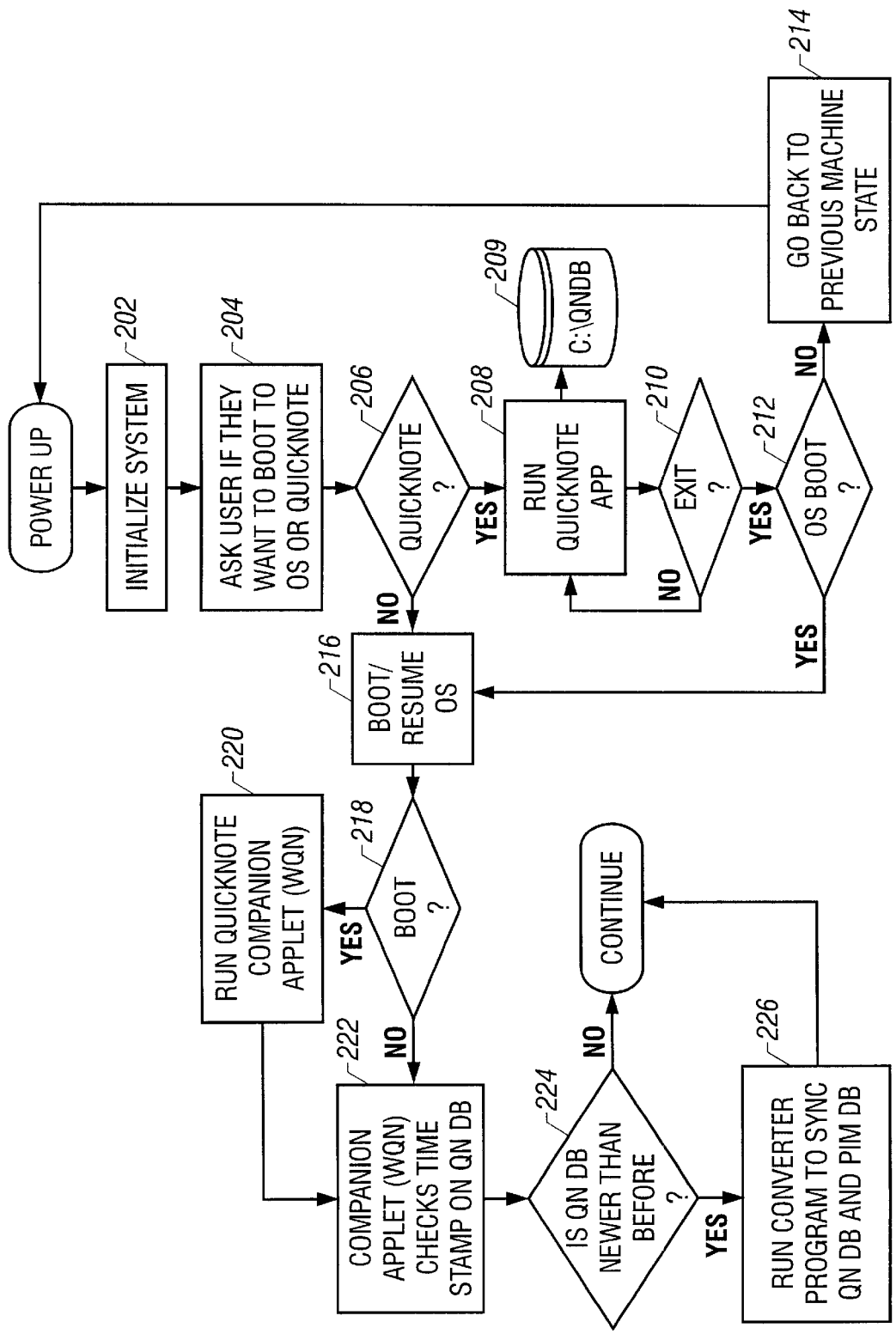
FIG. 2 is a flow diagram of actions performed by various routines or layers in the system of FIG. 1 according to one embodiment.

Referring to FIG. 2, a sequence of actions performed by the BIOS routine 404, the Quicknote routine 406, the operating system 400, and the Quicknote companion applet 402 is illustrated. When the system is turned on, the BIOS routine 404 is executed to boot or resume the system, depending on which off state the system was in. The BIOS routine 404 performs (at 202) certain tasks, which may include a cold boot sequence if the system is starting from a powered off state or restarting. However, if the off state is a low power state (e.g., sleep state, suspend state, etc.) from which the system 10 is able to resume, then the BIOS reloads certain system settings saved in a non-volatile storage medium during the low power state. During initialization (at 202), the BIOS routine 404 is also powering up the hard disk drive 120 or other storage medium.

Next, the BIOS routine 404 may prompt a user (at 204) which operating environment the user would like to enter. The user may be presented with two options in one embodiment, the full-feature operating environment or the Quicknote environment. In further embodiments, the system may enter other environments as well. Alternatively, the BIOS routine may access some predefined indicator, such as a flag, to determine which operating environment to enter. For example, upon exiting the system 10, a user may specify which operating environment to enter when the system 10 next starts up. Alternatively, a user may specify a default environment to enter.

If the BIOS routine determines (at 206) that the Quicknote environment is selected, then the Quicknote routine 406 (which may be stored in the second segment 302 of the non-volatile memory 128, for example) is run (at 208). In addition, the graphics routine, file system routine, and other routines in the non-volatile memory 128 may also be loaded to enable access to features and information in the Quicknote environment. The Quicknote routine 406 may have access to predetermined information, referred to as the Quicknote database (DB) 209, contained in the hard disk drive 120 or other storage medium in the system 10. The Quicknote routine 406 may also access predetermined features, such as communications through the transceiver 140. When the Quicknote routine 406 is initially started, it checks to determine if the storage medium containing the Quicknote DB 209 is ready for access. For example, the hard disk drive 120 may take some time to spin up. If the storage medium is not available, then the Quicknote routine 406 in one embodiment may access the subset of the Quicknote DB 209 stored in the non-volatile memory 128. As an example, the subset of information may contain the most recently updated information, such as a calendar list, address list, to do list, notes, electronic mail, and the like. In an alternative embodiment, the time needed to start the storage medium containing the Quicknote DB may be acceptable, in which case the Quicknote routine 406 may wait for the storage medium to start.

In the embodiment in which a subset of the Quicknote DB 209 is kept in the non-volatile memory 128, the Quicknote routine 406 may perform a time stamp check of data in the non-volatile memory 128 and data in the Quicknote DB 209 stored in another storage medium such as the hard disk drive 120. If the data in the non-volatile memory 128 has been updated with respect to data in the Quicknote DB 209, then the Quicknote DB 209 is updated accordingly by the Quicknote routine 406.

The Quicknote routine 406 also presents a text or graphical user interface on the display 112 for the user to access predetermined information and features in the system 10. As examples, a user may add an event to a calendar list or add a contact to an address list in the Quicknote DB 209. Also, the user may view contents of notes, files, electronic mail, and other information stored in the Quicknote DB 209. If the user updates any information, the Quicknote routine 406 updates the Quicknote DB 209 as well as the subset of information stored in the non-volatile memory segment 302.

The Quicknote routine 406 may be exited by some action performed by a user. For example, the user may request an exit through the text or graphics interface of the Quicknote routine 406. Alternatively, the Quicknote routine 406 may be exited when the user presses a power button or closes the lid of a notebook or mobile computer. When the user exits the Quicknote routine 406, as determined at 210, the BIOS routine 404 may prompt (at 212) the user to select whether to enter the full-feature operating environment. If not, the BIOS routine 404 proceeds (at 214) back to the previous machine state, which may be an off state.

If a full-feature operating system boot is desired (as determined at 212 or 206), then the BIOS routine 404 proceeds (at 216) to either boot or resume the operating system 400, depending on which off state the system 10 was in. The operating system 400 is booted if the system was initially in the powered off state. The operating system 400 is resumed if the system was originally in a low power state in which system context information was saved to a non-volatile storage medium.

After the operating system 400 is booted or resumed, it determines (at 218) whether the operating system 400 was booted or resumed. If booted, the operating system 400 invokes (at 220) the Quicknote companion applet 402, referred to as a WQN applet. If the operating system 400 was resumed, then the WQN applet 402 should already be loaded. To automatically start the WQN applet 402, the applet 402 may be included in the startup group or run/run services registry of an operating system such as a Windows® operating system. If the operating system 400 was resumed from a low power state, then it can notify the WQN applet 402 that the operating system has resumed using predefined events, such as events defined by the ACPI specification, events defined by the APM specification, or events defined in the OnNow architecture, as described at {http://www.microsoft.com/hwdev/desinit/ONNOW1.HTM}.

The WQN applet 402 then performs various tasks after it has been invoked or resumed. In one embodiment, a personal information manager (PIM) application (e.g., Microsoft Outlook, Lotus Organizer, and other applications) may be present that provides a calendar list, address list, notes, a to do list, electronic mail, and so forth. In such an embodiment, the Quicknote DB may be at least a subset of the information maintained by the PIM application. Any updates to the Quicknote DB 209 in the Quicknote environment are transferred to information maintained by the PIM application. To do so, the WQN applet 402 may check (at 222) the time stamp of the Quicknote DB 209 against an internal time stamp of the WQN applet 402. If the Quicknote DB 209 has been updated, as determined at 224, the WQN applet 402 may synchronize (at 226) the PIM information to the updated Quicknote DB 209. Synchronization may occur in both directions so that updates to the PIM information are transferred to the Quicknote DB 209, and vice versa. Alternatively, updates to the Quicknote DB 209 may be detected by performing a checksum of information in the Quicknote DB 209 and information maintained by the PIM application.

In other embodiments, a PIM application may not be present, in which case the WQN applet 402 may provide the user interface in the full-feature operating environment through which a user may access information in the Quicknote DB 209. In this embodiment, synchronization is not employed.

The synchronization performed at 226 may include running data synchronization software to synchronize the Quicknote DB 209 with the PIM data. One such data synchronization software includes an Intellisync product from Puma Technology Inc., which is capable of synchronizing data between different files and databases.

In one embodiment, synchronization may also be performed periodically (e.g., every 10 to 15 minutes) while the operating system 400 is running. The duration between updates may be set by a user or it may be based on other settings, such as the power source of the system 10 (e.g., battery or alternating current source in a mobile or notebook computer).

By default, the WQN applet 402 may store the most recently entered information (e.g., information entered in the last week or month) in the Quicknote DB 209. This may reduce the amount of information that has to be maintained in the Quicknote environment. Alternatively, the Quicknote DB 209 may include all of the information maintained by a PIM application. In one embodiment, the WQN applet 402 may present an interface through which a user may select the information from the PIM data that is to be kept in the Quicknote DB 209.

Software or firmware, including applications, operating system modules or routines, device drivers, BIOS modules or routines, and other routines or modules, may be stored or otherwise tangibly embodied in one or more storage media in the system 10.

Storage media suitable for tangibly embodying software and firmware instructions may include different forms of memory including semiconductor memory devices such as dynamic or static random access memories, erasable and programmable read-only memories (EPROMs), electrically erasable and programmable read-only memories (EEPROMs), and flash memories; magnetic disks such as fixed, floppy and removable disks; other magnetic media including tape; and optical media such as CD or DVD disks. The instructions stored in the storage media when executed cause the system 10 to perform programmed acts.

The software or firmware can be loaded into the system 10 in one of many different ways. For example, instructions or other code segments stored on storage media or transported through a network interface card, modem, or other interface mechanism may be loaded into the system 10 and executed to perform programmed acts. In the loading or transport process, data signals that are embodied as carrier waves (transmitted over telephone lines, network lines, wireless links, cables and the like) may communicate the instructions or code segments to the system 10.

Advantages offered by some embodiments of the invention may include one or more of the following. Quicker access is provided to predetermined information and features since a full-feature operating system does not need to be loaded. This may be convenient when a user needs to retrieve a phone number from a system to make a phone call, or to make notes or add information to a calendar or address list. Flexibility is provided since a user has access to both a full-feature environment as well as to an alternative environment that provides quicker access to information and features in one system.

While the invention has been disclosed with respect to a limited number of embodiments, those skilled in the art will appreciate numerous modifications and variations therefrom. It is intended that the appended claims cover all such modifications and variations as fall within the true spirit and scope of the invention.

What is claimed is:

1. A method for use in a system, comprising:

providing at least one operating system;

receiving an indication to provide a predefined operating environment without loading any operating system;

running a routine in the predefined operating environment without loading any operating system in response to the indication; and receiving, under control of the routine, requests to access information contained in a storage medium in the system.

2. The method of claim 1, further comprising:

receiving one other indication to load the at least one operating system; and loading the at least one operating system in response to the one other indication.

3. The method of claim 2, further comprising booting the at least one operating system in response to the one other indication and the system starting from a powered off state.

4. The method of claim 2, further comprising resuming the at least one operating system in response to the one other indication and the system starting from a low power state in which system context information has been saved to a non-volatile storage medium.

5. The method of claim 1, further comprising accessing a first set of information under control of the routine.

6. The method of claim 5, further comprising running an application in a second operating environment provided by the at least one operating system to access a second set of information.

7. The method of claim 6, further comprising synchronizing the first and second sets of information.

8. A system comprising:

at least one operating system; and a first routine adapted to selectively load the at least one operating system or to cause provision of a predefined operating environment without loading any operating system, the predefined operating environment to present an interface through which a user may access predetermined information, the first routine adapted to transition the system from the predefined operating environment to an off state without loading any operating system.

9. The system of claim 8, further comprising:

a storage medium to store the predetermined information; and a second routine invocable by the first routine to provide the predetermined operating environment to allow access to the predetermined information.

10. The system of claim 8, further comprising an application capable of running under the at least one operating system to manage access to a second set of information, wherein the predetermined information is at least a subset of the second set of information.

11. The system of claim 10, wherein the application includes a personal information management application.

12. The system of claim 10, further comprising a synchronization routine to synchronize the predetermined information with the second set of information.

13. The system of claim 8, wherein the first routine includes a basic input/output system routine.

14. The system of claim 8, wherein the off state includes a powered off state.

15. The system of claim 8, wherein the off state includes a low power state.

16. The system of claim 15, further comprising a non-volatile storage medium, wherein the low power state includes a state in which context information of the system is stored in the non-volatile storage medium.

17. A system comprising:

first and second operating environments;

a first program active in the first operating environment that controls access to a first set of information;

a second program active in the second operating environment that controls access to a second set of information, the second operating environment active without loading an operating system; and a synchronization program that synchronizes information between the first and second sets.

18. The system of claim 17, further comprising an operating system that provides the first operating environment.

19. The system of claim 17, wherein the second set of information is at least a subset of the first set of information.

20. The system of claim 17, wherein the first program includes a personal information management application.

21. An article including a machine-readable storage medium containing instructions that when executed cause a system to:

determine whether to load any operating system in the system;

present an alternative operating environment if no operating system is to be loaded; and allow access to predetermined information in the alternative operating environment.

22. The article of claim 21, wherein the storage medium contains instructions that when executed cause the system to boot an operating system if the operating system is to be loaded and the system is starting from a powered off state.

23. The article of claim 21, wherein the storage medium contains instructions that when executed cause the system to resume an operating system if the operating system is to be loaded and the system is starting from a low power state.

24. A system comprising:

a storage medium;

at least one operating system that provides at least a first operating environment having features;

a routine to provide a second operating environment without loading any operating system, the second operating environment having less than all of the features of the first operating environment; and a processor, the routine executable on the processor in the second environment to access data in the storage medium.

* * * * *